United States Patent
Takakura et al.

(10) Patent No.: US 6,477,830 B2
(45) Date of Patent: Nov. 12, 2002

(54) FAULT DETERMINING APPARATUS FOR EXHAUST PASSAGE SWITCHING VALVE

(75) Inventors: Shiro Takakura, Saitama-ken (JP); Masaki Ueno, Saitama-ken (JP); Masahiro Sato, Saitama-ken (JP); Tetsuo Endo, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 18 days.

(21) Appl. No.: 09/833,615

(22) Filed: Apr. 13, 2001

(65) Prior Publication Data

US 2002/0011066 A1 Jan. 31, 2002

(30) Foreign Application Priority Data

Jun. 27, 2000 (JP) .......................................... 2000-193520

(51) Int. Cl.[7] ................................................. F01N 3/00
(52) U.S. Cl. ............................. 60/277; 60/288; 60/292; 60/297; 60/324
(58) Field of Search ........................... 60/277, 288, 287, 60/292, 297, 324

(56) References Cited

U.S. PATENT DOCUMENTS

| | | | | |
|---|---|---|---|---|
| 4,993,386 A | * | 2/1991 | Ozasa et al. ................. | 123/417 |
| 5,634,332 A | * | 6/1997 | Tanaka et al. ................ | 60/284 |
| 5,761,902 A | * | 6/1998 | Usami et al. ................. | 60/288 |
| 6,321,533 B1 | * | 11/2001 | Watanabe et al. ............. | 60/324 |
| 6,354,076 B1 | * | 3/2002 | Yasui et al. .................. | 60/274 |

* cited by examiner

Primary Examiner—John J. Vrablik
Assistant Examiner—Binh Tran
(74) Attorney, Agent, or Firm—Arent Fox Kintner Plotkin & Kahn, PLLC

(57) ABSTRACT

A fault determining apparatus for an exhaust passage switching valve which is capable of directly, rapidly and properly determining a fault in an exhaust passage switching valve, under conditions such as immediately after the start of an internal combustion engine, in which the switching valve should be essentially operated, without the need for setting a special fault determining mode. The fault determining apparatus determines a fault in the exhaust passage switching valve for switching an exhaust passage of exhaust gases discharged from an internal combustion engine between a main exhaust passage having a three-way catalyst and a bypass exhaust passage having filled in an intermediate portion thereof an adsorbent capable of adsorbing hydrocarbons and moisture in the exhaust gases in accordance with an activated state of the three-way catalyst. The fault determining apparatus comprises a humidity sensor for detecting a humidity of the exhaust gases introduced into the bypass exhaust passage, and an ECU for determining a fault in the exhaust passage switching valve based on the result of detection performed by the humidity sensor when the exhaust passage should have been switched to the bypass exhaust passage by the exhaust passage switching valve.

4 Claims, 7 Drawing Sheets

FAULT DETERMINING APPARATUS FOR EXHAUST PASSAGE SWITCHING VALVE

BACKGROUND OF THE INVENTION

1. Field of the Invention

The present invention relates generally to a fault determining apparatus for an exhaust passage switching valve, and more particularly, to such an apparatus for determining a fault of an exhaust passage switching valve which switches an exhaust passage for exhaust gases discharged from an internal combustion engine from a main exhaust passage to a bypass exhaust passage having an adsorbent capable of adsorbing hydrocarbons and moisture contained in the exhaust gases, and vice versa.

2. Description of the Prior Art

Generally, in an exhaust system of a gasoline engine or the like, a three-way catalyst is arranged at an intermediate portion of an exhaust pipe in order to purify harmful substances (hydrocarbons, carbon monoxide and nitrogen compounds) in exhaust gases. However, since the three-way catalyst has not been activated, for example, immediately after a cold start of the engine (for example, for about 30–40 seconds from the start), the harmful substances may not be sufficiently purified, so that among the harmful substance, particularly hydrocarbons are emitted from the engine as they are as unburned combustible components. Therefore, in order to prevent emission of hydrocarbons in the air, there has been proposed an engine which incorporates not only the three-way catalyst but also an adsorbent, which is capable of adsorbing hydrocarbons, in the exhaust pipe. Such an adsorbent is arranged in a bypass exhaust passage branched from a main exhaust passage in which a three-way catalyst is arranged. In addition, a switching valve is arranged in the exhaust pipe for switching an exhaust passage for exhaust gases. This switching valve opens/closes the bypass exhaust passage in accordance with the state of the three-way catalyst to switch the exhaust passage from the main exhaust passage to the bypass exhaust passage, and vice versa.

Specifically, when the three-way catalyst remains inactive, for example, at a start of the engine, the switching valve opens only the bypass exhaust passage to introduce exhaust gases into the bypass exhaust passage and adsorb hydrocarbons in the exhaust gases to the adsorbent, thereby purifying the exhaust gases. On the other hand, when the three-way catalyst has been activated by a warm-up operation of the engine, the switching valve closes the bypass exhaust passage to pass the exhaust gases only to the main exhaust passage to purify the exhaust gases with the three-way catalyst. The adsorbent adsorbs hydrocarbons in a low temperature state (for example, below 100° C.), and desorbs the once adsorbed hydrocarbons when it has been heated to a predetermined temperature or higher (for example, 100–250° C.). The desorbed hydrocarbons are recirculated to the engine through an EGR pipe and so on.

While the switching valve normally operates as described above to permit appropriate purification of exhaust gases from the engine immediately after the start thereof, a fault in the switching valve, if any, disables appropriate purification of exhaust gases, so that it is necessary to monitor the switching valve for a fault. A fault determining apparatus for determining such a fault in a switching valve is known, for example, from Laid-open Japanese Patent Application No. 10-159544.

This fault determining apparatus has a temperature sensor arranged at a location downstream of an adsorbent in a bypass exhaust passage. For determining a fault in a switching valve during an operation of the engine, the fault determining apparatus forces the switching valve to perform a predetermined switching operation, and determines a fault in the switching valve based on a change in temperature of exhaust gases (hereinafter called the "post-adsorption exhaust gases" in this disclosure) downstream of the adsorbent, which is adsorbing hydrocarbons, before and after the switching operation. More specifically, when the engine is, for example, in a steady-state operating condition (for example, during idling), the switching valve is forcedly switched to cause a temporary change in the state of the exhaust passage from a state in which the bypass exhaust passage is closed and the main exhaust passage is opened to the reverse state, i.e., a state in which the bypass exhaust passage is opened and the main exhaust passage is closed. Then, the fault determining apparatus determines that the switching valve is faulty if a changing amount of the temperature detected by the temperature sensor respectively before and after the switching operation is equal to or less than a predetermined value. It should be noted that this determination takes advantage of the fact that the adsorption of hydrocarbons by the adsorbent involves an endothermic action.

As described above, the fault determining apparatus forces the switching valve to operate, after the start of the engine, when the three-way catalyst has been activated so that exhaust gases can be purified by the three-way catalyst and when the engine remains in a steady-state operating condition, to thereby open the bypass exhaust passage and close the main exhaust passage, and determines whether the switching valve fails. As such, the fault determining apparatus can determine a fault in the switching valve only when the engine is operating in a steady-state condition after the temperature of exhaust gases has been stabilized, but cannot directly determine whether or not the switching valve is actually operating under conditions in which the switching valve should essentially operate. In addition, since the detected temperature is generally slow in change, low in responsibility, and susceptible to the influence of various parameters including external air temperature and so on, an erroneous determination is likely to result when the fault determination of the switching valve is based on the detected temperature. Also, the fault determining apparatus must delay the execution of the switching valve fault determination until the engine enters the steady-state operating condition after the start, causing the fault determination to be time-consuming. Furthermore, the switching valve must be forcedly operated only for determining a fault in the switching valve in the steady-state operating condition in which the switching valve need not be essentially operated. For implementing this switching valve operation for the fault determination, a switching valve fault determining mode must be specially provided.

OBJECT AND SUMMARY OF THE INVENTION

The present invention has been made to solve the problems as mentioned above, and its object is to provide a fault determining apparatus for an exhaust passage switching valve which is capable of directly, rapidly and properly determining a fault in an exhaust passage switching valve, under conditions such as immediately after the start of an internal combustion engine, in which the switching valve should be essentially operated, without the need for setting a special fault determining mode.

To achieve the above object, the present invention provides a fault determining apparatus for determining a fault in an exhaust passage switching valve for switching an exhaust passage of exhaust gases discharged from an internal combustion engine between a first exhaust passage having a three-way catalyst and a second exhaust passage branched off at a location downstream of the three-way catalyst of the first exhaust passage and having filled in an intermediate portion thereof an adsorbent capable of adsorbing hydrocarbons and moisture in the exhaust gases in accordance with an activated state of the three-way catalyst. The fault determining apparatus includes a humidity sensor arranged at a location downstream of the adsorbent in the second exhaust passage for detecting a humidity of the exhaust gases introduced into the second exhaust passage, and switching valve fault determining means for determining a fault in the exhaust passage switching valve based on a result of detection performed by the humidity sensor when the exhaust passage should have been switched to the second exhaust passage by the exhaust passage switching valve.

According to the foregoing configuration, when the three-way catalyst has not been activated, such as immediately after the start of the internal combustion engine, the exhaust passage switching valve switches the exhaust passage to the second exhaust passage, causing exhaust gases to flow into the second exhaust passage so that hydrocarbons and moisture in the exhaust gases are adsorbed by the adsorbent. On the other hand, when the three-way catalyst has been activated, the exhaust passage is switched to the first exhaust passage, causing the exhaust gases to flow only into the first exhaust passage so that the exhaust gases are purified by the three-way catalyst. Then, upon switching the exhaust passage to the second exhaust passage, when the exhaust passage switching valve is normally operating so that exhaust gases are flowing sufficiently into the second exhaust passage, hydrocarbons and moisture in the exhaust gases are adsorbed by the adsorbent to cause a gradual reduction in the adsorbing capacity of the adsorbent, resulting in a gradual increase, on the contrary, in moisture in the exhaust gases (post-adsorption exhaust gases), and accordingly a gradual increase in the humidity detected by the humidity sensor arranged at a location downstream of the adsorbent. On the other hand, upon switching to the second exhaust passage, if the exhaust passage switching valve is not normally operating so that exhaust gases are not at all flowing into the second exhaust passage or are flowing but not sufficiently, the value of humidity detected by the humidity sensor hardly increases or its increasing rate becomes smaller. In this way, since the result of the detection performed by the humidity sensor when the exhaust passage switching valve should have switched the exhaust passage to the second exhaust passage differs depending on whether or not the exhaust passage switching valve is normally operating, a fault in the exhaust passage switching valve can be determined based on the result of the detection.

Also, unlike the prior art, the fault determination for the exhaust passage switching valve is performed under the conditions in which the exhaust passage switching valve should be operated, making use of its operation, so that the fault determination for the exhaust passage switching valve can be directly, properly and rapidly carried out without the need for setting a special fault determination mode or waiting for the internal combustion engine to enter the steady-state operating condition. Further, since the humidity of exhaust gases is used as a parameter for determining a fault in the exhaust passage switching valve, the fault determination can be accurately and properly carried out. It should be noted that "a fault in the exhaust passage switching valve" as used in the disclosure refers to not only a fault in the exhaust passage switching valve itself but also a fault in the entire exhaust passage switching system including a driver for driving the exhaust passage switching valve, and so on.

Preferably, in one embodiment of the fault determining apparatus for an exhaust passage switching valve, the switching valve fault determining means determines a fault in the exhaust passage switching valve based on the result of detection performed by the humidity sensor when a predetermined time has elapsed from a start of the internal combustion engine.

According to the foregoing embodiment, since the fault determination is performed for the exhaust passage switching valve based on the result of detection by the humidity sensor when the predetermined has elapsed from the start of the internal combustion engine (hereinafter simply called "at the start"), the fault determination can be reliably carried out at a predetermined timing after the determining time has elapsed from the start, for example, by comparing the result of the detection with a predetermined reference humidity of exhaust gases which should be detected after the lapse of the predetermined time when the exhaust passage switching valve is normally operating.

Preferably, in another embodiment, the fault determining apparatus for an exhaust passage switching valve further includes atmospheric state detecting means for detecting an atmospheric state, fault determination execution deciding means for deciding whether or not a fault determination is performed for the exhaust passage switching valve by the switching valve fault determining means based on results of detections performed by the atmospheric state detecting means and the humidity sensor at the start of the internal combustion engine.

According to the foregoing embodiment, the fault determination execution deciding means decides whether or not fault determination is performed for the exhaust passage switching valve by the switching valve fault determining means based on results of detections performed by the atmospheric state detecting means and the humidity sensor at the start of the internal combustion engine. Since the degree of increase in the humidity of exhaust gases depends on the atmospheric state, for example, a saturated absolute humidity in the atmosphere at the start, and the humidity of the exhaust gases detected by the humidity sensor at the start, this may cause an error in the fault determination based on the result of the detection by the humidity sensor. Therefore, the foregoing embodiment can avoid such erroneous determination on a fault in the exhaust passage switching valve.

Preferably, in one embodiment of the fault determining apparatus for an exhaust passage switching valve, the adsorbent includes zeolite.

According to the foregoing embodiment, since the adsorbent made of zeolite is highly heat resistant and also less susceptible to deterioration, as compared with, for example, silica gel, active carbon, or the like used as an adsorbent, the humidity of exhaust gases introduced into the second passage will not excessively increase due to a deterioration of the adsorbent, but the adsorbent provides a stable moisture adsorbing characteristic, thereby making it possible to more properly carry out the fault determination for the exhaust passage switching valve.

DETAILED DESCRIPTION OF THE EMBODIMENT

Figure 1:
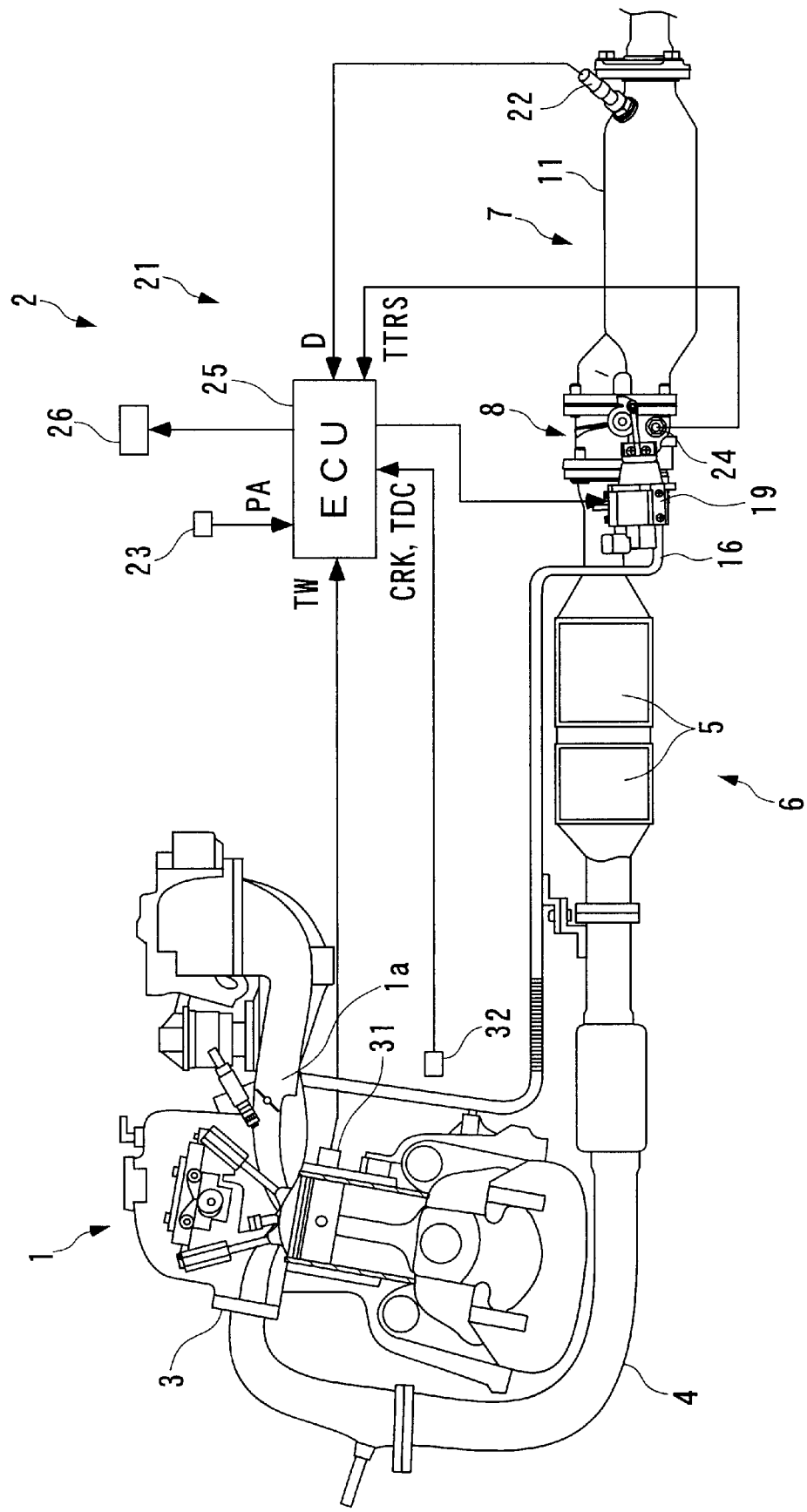
FIG. 1 is a diagram generally illustrating the structure of an internal combustion engine in which a fault determining apparatus for a switching valve according to one embodiment of the present invention is applied.

In the following, a preferred embodiment of the present invention will be described in detail with reference to the accompanying drawings. FIG. 1 illustrates an internal combustion engine in which a fault determining apparatus for an exhaust passage switching valve according to one embodiment of the present invention is applied. An exhaust system 2 of the illustrated internal combustion engine (hereinafter simply called the "engine") 1 emits exhaust gases emitted from the engine 1 to the outside (atmosphere) while purifying the same, and recirculate a portion of the exhaust gases to the engine 1 (EGR). The exhaust system 2 has an exhaust pipe 4 which is connected to the engine 1 through an exhaust manifold 3.

The exhaust system 2 is also provided, at intermediate locations of the exhaust pipe 4, with a catalyzer 6 having two three-way catalysts 5 as an exhaust gas purifying catalyst for purifying exhaust gases, and a hydrocarbon adsorbent catalyzer 7 for adsorbing hydrocarbons. The two three-way catalysts 5 of the catalyzer 6 are arranged adjacent to each other along the exhaust pipe 4. The three-way catalysts 5 are activated, when they are heated to a predetermined temperature (for example, 300° C.) or higher, to purify harmful substances (hydrocarbons, carbon monoxide and nitrogen compounds) in exhaust gases passing through the catalyst 6 by oxidation-reduction catalyst actions.

Figure 2:
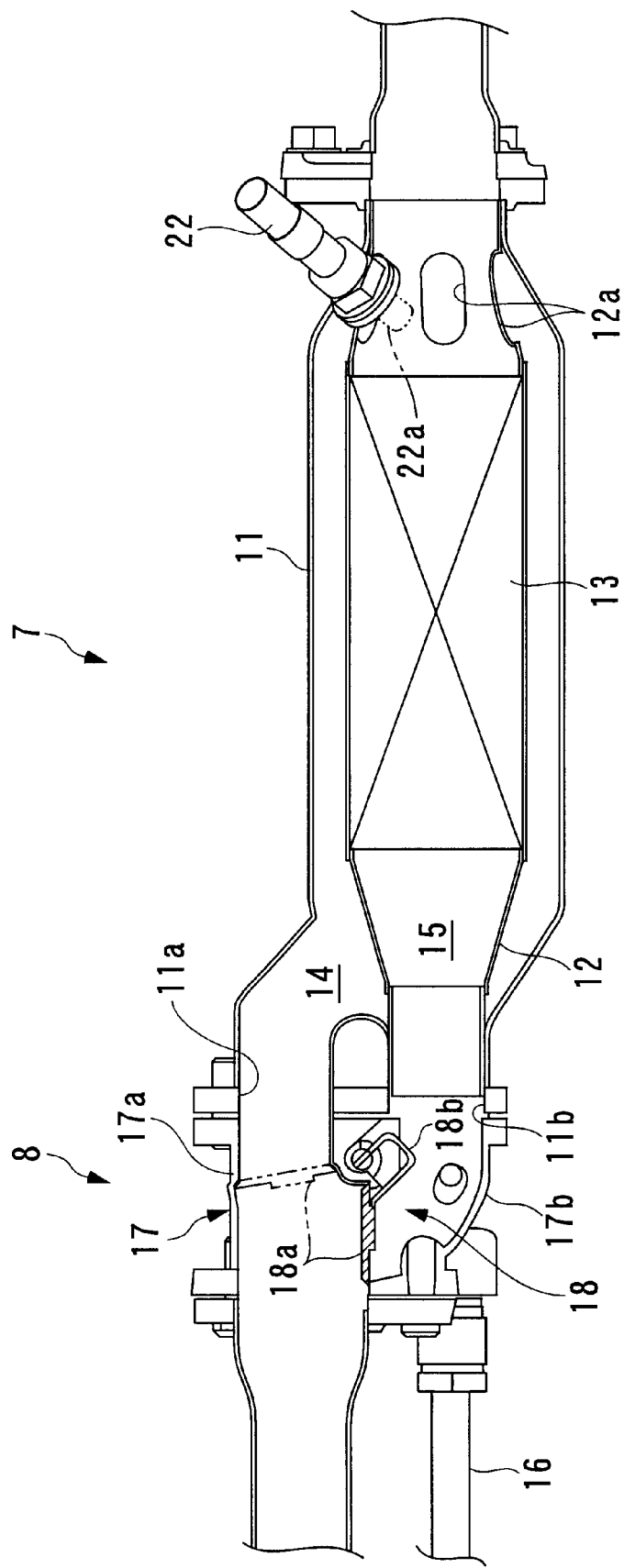
FIG. 2 is an enlarged cross-sectional view illustrating a hydrocarbon adsorbent catalyzer.

The hydrocarbon adsorbent catalyzer 7 in turn is arranged at a location downstream of the catalyzer 6 in the exhaust pipe 4 for adsorbing hydrocarbons in exhaust gases during a starting period of the engine 1 (for example, for approximately 30 to 40 seconds from the start), in which the three-way catalysts 5 are not activated, to largely reduce hydrocarbons in the exhaust gases which would otherwise be emitted to the outside. As illustrated in FIGS. 1 and 2, the hydrocarbon adsorbent catalyzer 7 comprises a case 11 coupled to a downstream end of the catalyzer 6 through an exhaust passage switch 8 and defining a substantially cylindrical shell; a bypass exhaust pipe 12 arranged in the case 11; and a cylindrical HC adsorbent 13 filled in an intermediate portion of the bypass exhaust pipe 12 for adsorbing hydrocarbons in exhaust gases which flow into the bypass exhaust passage 12.

As illustrated in FIG. 2, the case 11 has its upstream end divided into two, i.e., upper and lower openings, wherein the upper opening 11a communicates with a main exhaust passage 14 of the exhaust pipe 4 as a first exhaust passage as well as communicates with a space having a troidal cross-section outside of the bypass exhaust pipe 12 within the case 11 (this space having a troidal cross-section is also included in the main exhaust passage), while the lower opening 11b communicates with an internal space (a bypass exhaust passage 15 as a second exhaust passage) of the bypass exhaust pipe 12.

The bypass exhaust pipe 12 has its upstream end connected to the inner face of the lower opening 11b of the case 11 in an air tight state, and its downstream end to the inner face of the lower end of the case 11 likewise in an air tight state. The bypass exhaust pipe 12 is formed, at a location near the downstream end, with a plurality (for example, five) elongated throughholes 12a at equal intervals in the circumferential direction, such that downstream portions of the main exhaust passage 14 and the bypass exhaust passage 15 in the case 11 communicate with each other through the throughholes 12a.

The HC adsorbent 13 is comprised of a honeycomb core (not shown), made of a metal, which carries zeolite on its surface. As exhaust gases introduced into the bypass exhaust passage 15 pass through the inside of the HC adsorbent 13, hydrocarbons and moisture in the exhaust gases are adsorbed by the zeolite in the HC adsorbent 13. Zeolite, which has high heat resistant properties, adsorbs hydrocarbons when it is in a low temperature state (for example, below 100° C.), and desorbs hydrocarbons once adsorbed thereby at a predetermined temperature or higher (for example, 100 to 250° C.). Then, the desorbed hydrocarbons are recirculated to the engine 1 through an EGR pipe 16 which has the two ends connected to a branch pipe 17b, later described, of the exhaust passage switch 8 and an intake pipe 1a of the engine 1, respectively. The recirculated hydrocarbons are burnt by the engine 1. It should be noted that the zeolite is only required to have the ability of adsorbing hydrocarbons and moisture and is not particularly limited in type. This embodiment employs a mixture of USY (Y-type), Ga-MFI and ferrierite.

The exhaust passage switch 8 connects the hydrocarbon adsorbent catalyzer 7 constructed as described above to the catalyzer 6, and selectively switches an exhaust passage of exhaust gases passing through the catalyzer 6 to the main exhaust passage 14 or to the bypass exhaust passage 15 in accordance with an activated state of a three-way catalyst 5. The exhaust passage switch 8 comprises a substantially cylindrical coupling pipe 17, and a switching valve (exhaust passage switching valve) 18 arranged in the coupling pipe 18 for switching the exhaust passage. The coupling pipe 17 is comprised of a main pipe portion 17a for air-tight communicating the lower end of the catalyzer 6 with the main exhaust passage 14 of the hydrocarbon adsorbent catalyzer 7; and a branch pipe portion 17b branched off an upstream portion of the main pipe portion 17a for air-tight communicating the lower end of the catalyzer 6 with the bypass exhaust passage 15 of the hydrocarbon adsorbent catalyst 7.

The switching valve 18 in turn comprises a discoidal valve body 18a, and an arm 18c in a predetermined shape for supporting the valve body 18a at one end thereof. As the arm 18c is pivotally driven about the other end thereof over a predetermined angular distance by a switching valve driver 19 (see FIG. 1) controlled by an ECU 25, later described, the valve body 18a is also pivoted to open one of the main pipe portion 17a and the branch pipe portion 17b and to close the other. Thus, when the valve body 18a opens the main pipe portion 17a and closes the branch pipe portion 17b as illustrated in FIG. 2, exhaust gases through the catalyzer 6 pass the main pipe portion 17a, and flow into the main exhaust passage 14 in the case 11. Conversely, when the valve body 18a closes the main pipe portion 17a and opens the branch pipe portion 17b (see two-dot chain lines in FIG. 2), exhaust gases through the catalyzer 6 pass the branch pipe portion 17b and flows into the bypass exhaust passage 15. The arm 18b is provided at the other end with a helical torsion coil spring, not shown, which causes the valve body 18a to normally open the main pipe portion 17a and close the branch pipe portion 17b, as illustrated in FIG. 2.

In the exhaust passage switch 8 constructed as described above, immediately after the engine 1 is started, the valve body 18a normally closing the branch pipe portion 17b is pivotally driven to open the branch pipe portion 17b and close the main pipe portion 17a. This causes exhaust gases passing through the catalyzer 6 to flow through the branch pipe portion 17b, guided by the bypass exhaust passage 15, whereby hydrocarbons and moisture are adsorbed by the HC adsorbent 13, and the exhaust gases passing through the HC adsorbent 13 (post-adsorption exhaust gas) flow further toward the downstream, and is eventually emitted to the outside. Then, as a certain period of time has elapsed from the start of the engine 1 and the three-way catalysts 5 of the catalyzer 6 have been activated, the valve body 18a which has closed the main pipe portion 17a is again pivotally driven to open the main pipe portion 17a and close the branch pipe portion 17b. This causes the exhaust gases passing through the catalyzer 6 to flow through the main pipe portion 17a, guided by the main exhaust passage 14 in the case 11. Then, the exhaust gases flow into the bypass exhaust pipe 12 through the communication holes 12a in the downstream end portion of the bypass exhaust pipe 12, flow further toward the downstream, and is eventually emitted to the outside.

Next, description will be made on a fault determining apparatus for determining a fault in the switching valve 18 in the exhaust passage switch 8. This fault determining apparatus 21 comprises a humidity sensor 22 attached to the case 11 of the hydrocarbon adsorbent catalyzer 7 for detecting the humidity of the post-adsorbent exhaust gases, which are exhaust gases having passed through the HC adsorbent 13; an atmospheric pressure sensor 23 for detecting an atmospheric pressure; a temperature sensor 24 attached to the branch pipe portion 17b of the coupling pipe 17 for detecting the temperature of the HC adsorbent 13; the ECU 25 (functioning as switching valve fault determining means, atmospheric condition detecting means, and fault determination execution deciding means) for determining a fault in the switching valve 18 based on results of detections made by these sensors 22, 23, 24; and an alarm lamp 26 responsive to a determination of the ECU 25 that the switching valve 18 fails for notifying the operator to that effect.

The humidity sensor 22 has a detector 22a at a leading end, attached to a downstream end portion of the case 11 so as to face the bypass exhaust passage 15 through one of the communication holes 12a of the bypass exhaust pipe 12 for detecting an absolute humidity D of the post-adsorption exhaust gases, and sending a detection signal indicative of the absolute humidity D to the ECU 25. The atmospheric pressure sensor 23 in turn detects an atmospheric pressure PA and sends a detection signal indicative of the atmospheric pressure PA to the ECU 25. Also, the temperature sensor 24 detects the temperature of exhaust gases flowing into the bypass exhaust passage 15 to detect the temperature TTRS of the HC adsorbent 13 (HC adsorbent temperature), and sends a detection signal indicative of the temperature TTRS to the ECU 25. Since details on the humidity sensor 22 are described in Japanese Patent Application No. 2000-23085 previously proposed by the present applicant, description thereon is herein omitted.

A water temperature sensor 31 comprised of a thermistor or the like is also attached to the body of the engine 1. The water temperature sensor 31 detects an engine water temperature TW, which is the temperature of cooling water that circulates in a cylinder block of the engine 1, and sends a detection signal indicative of the engine water temperature TW to the ECU 25. The engine 1 is also provided with a crank angle sensor 32 which supplies the ECU 25 with a CRK signal and a TDC signal, which are pulse signals, at every predetermined crank angle as a crank shaft, not shown, of the engine 1 is rotated. The TDC signal is generated such that one pulse is supplied to the ECU 25, for example, each time the crank shaft is rotated over 180 degrees.

The ECU 25 is based on a microcomputer which comprises an I/O interface, a CPU, a RAM, a ROM and so on. The detection signals from the variety of sensors such as the foregoing humidity sensor 22, atmospheric sensor 23 and so on undergo A/D conversion and waveform shaping in the I/O interface, respectively, and thereafter inputted to the CPU. The CPU determines an operating state of the engine 1 in response to the detection signals from the variety of sensors in accordance with a control program and so on stored in the ROM, and also determines a fault in the switching valve 18 in accordance with a determined operating state. Then, the ECU 25 outputs a control signal to the alarm lamp 26, when it determines that the switching valve 18 fails, to turn on the alarm lamp 26, thereby notifying the driver of the fault in the switching valve 18.

Figure 3:
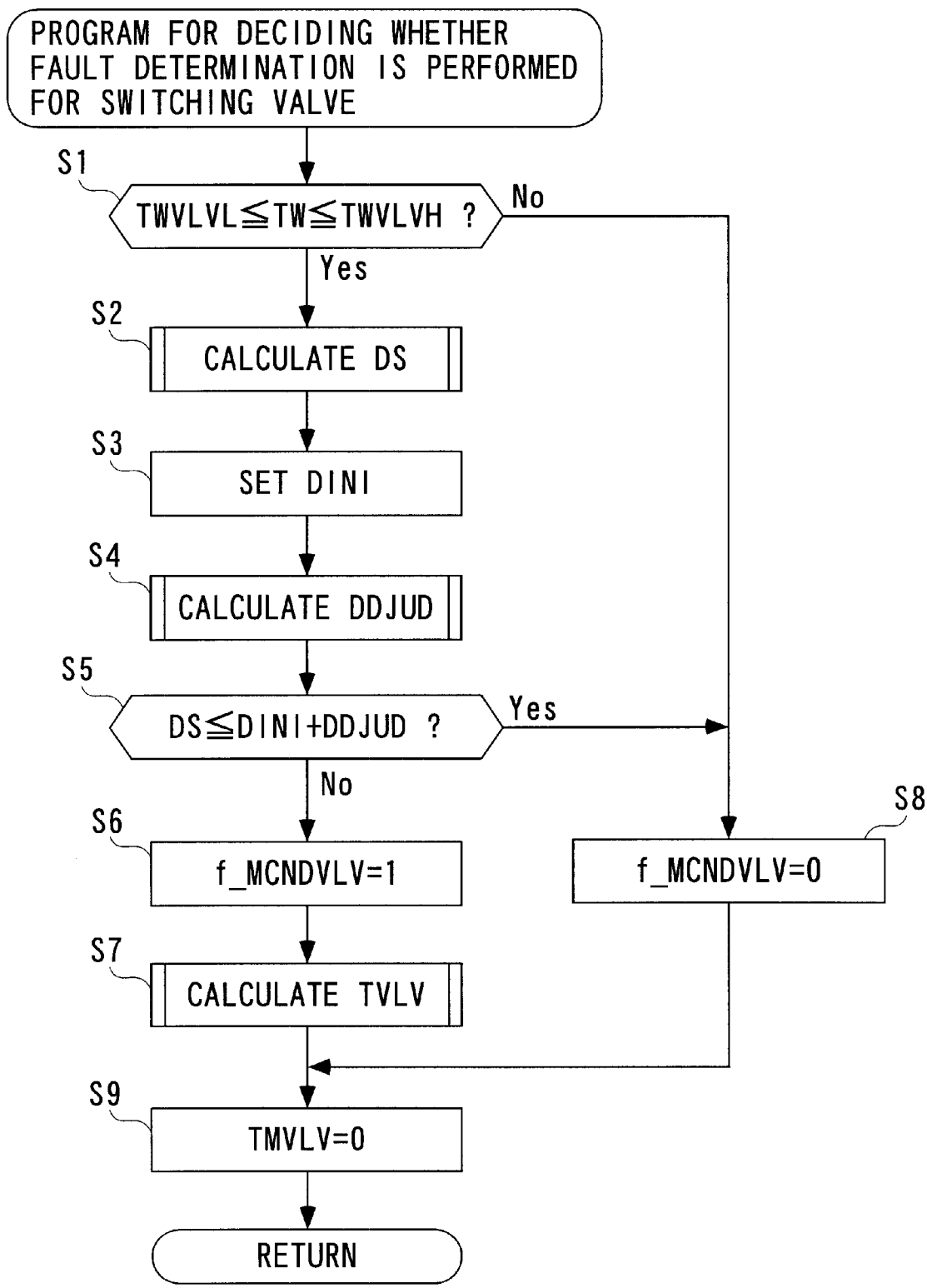
FIG. 3 is a flow chart illustrating a program for deciding whether or not the fault determining apparatus performs a fault determination for the switching valve.
Figure 4:
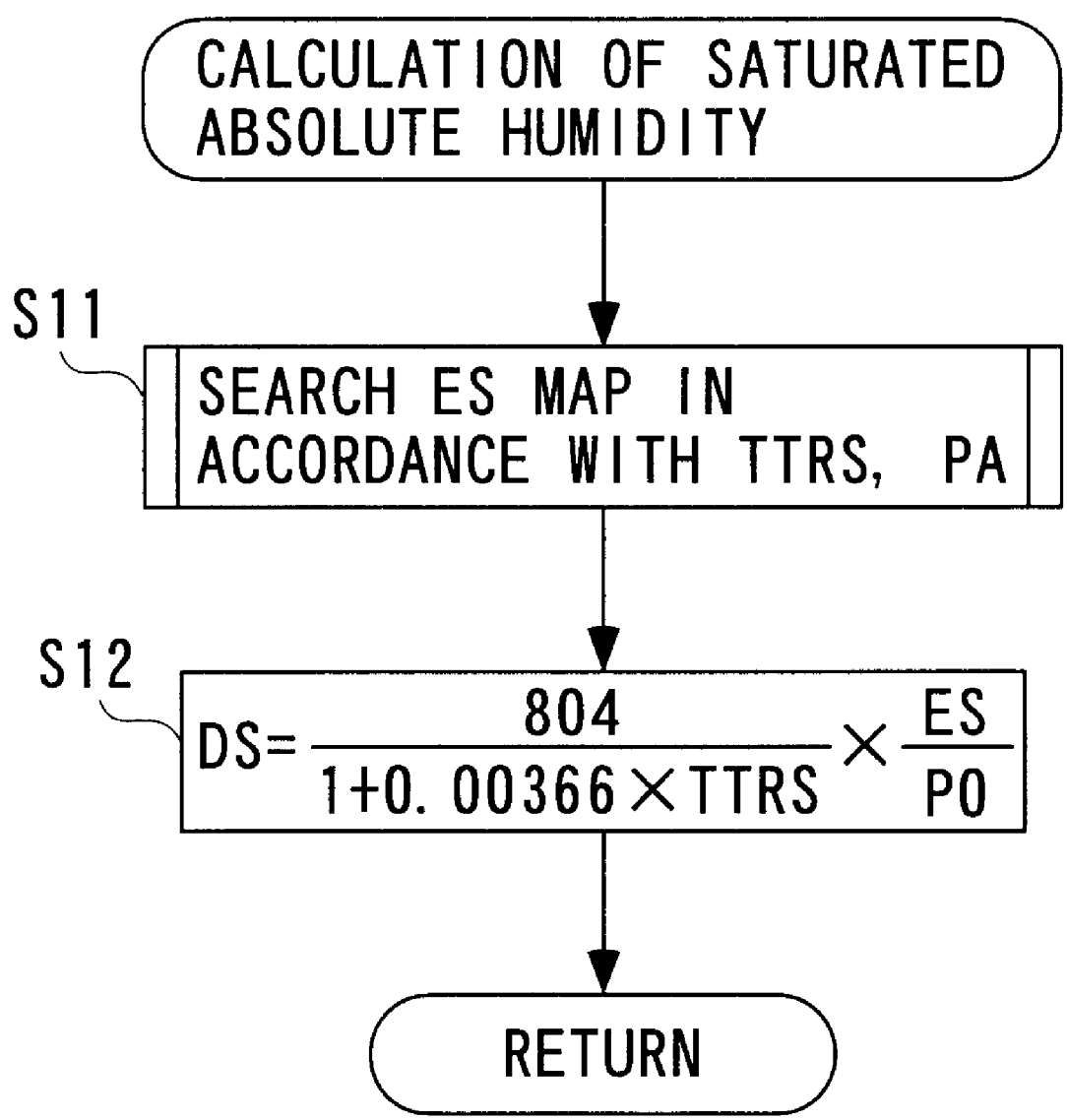
FIG. 4 is a flow chart illustrating a program for calculating a saturated absolute humidity DS.
Figure 5:
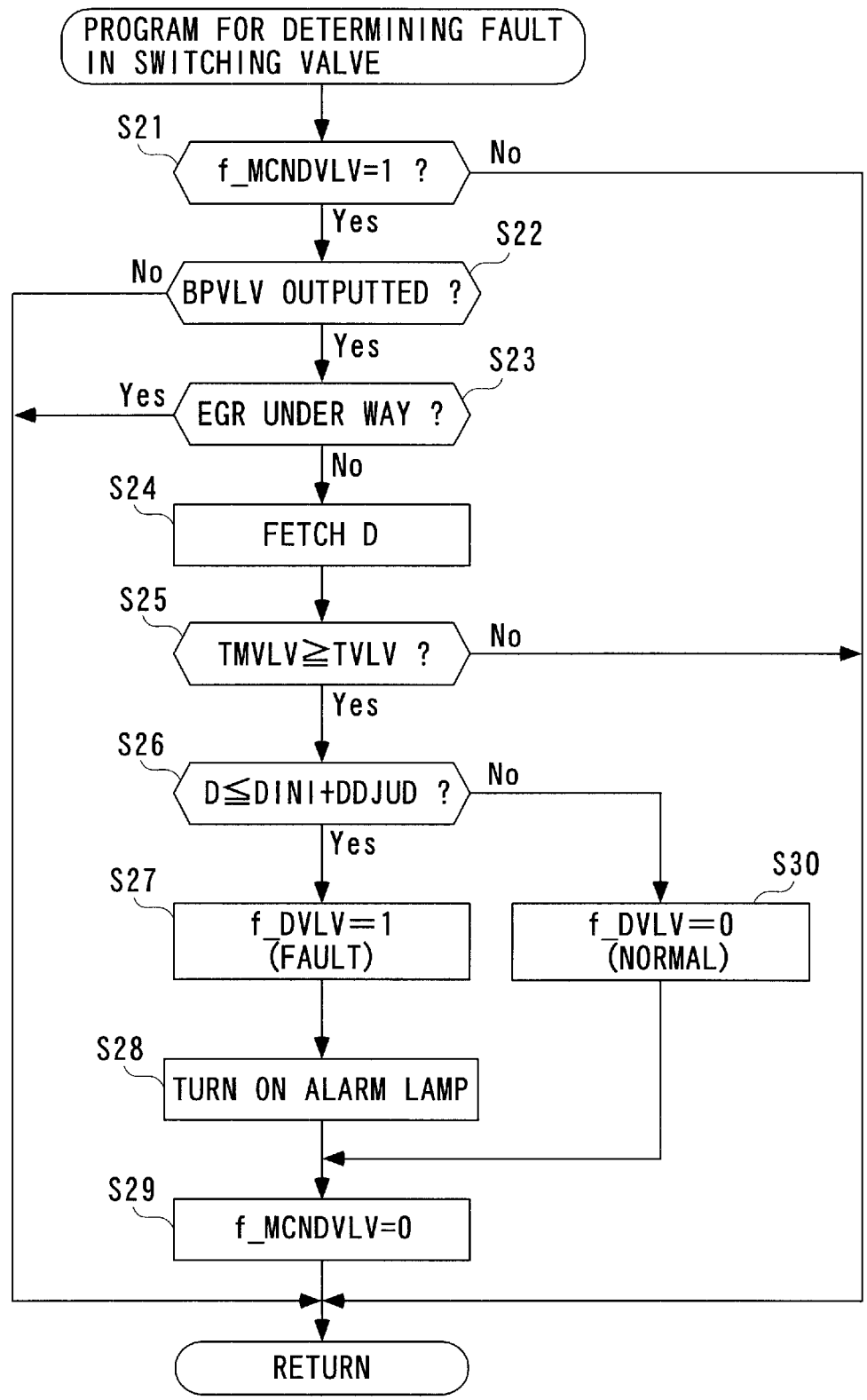
FIG. 5 is a flow chart illustrating a program executed by the fault determining apparatus for determining a fault in the switching valve.

Next, a program executed by the fault determining apparatus 21 for determining a fault in the switching valve 18 will be described in a specific manner with reference to flow charts of FIGS. 3 through 5. FIG. 3 is a flow chart illustrating a program for deciding whether or not the fault determining apparatus performs a fault determination for the switching valve. The execution decision program is executed only once when the engine 1 is started. In this program, it is first determined at step 1 (indicated by "S1" in FIG. 3 and the subsequent drawings as well) whether or not the engine water temperature TW of the engine 1 is within a predetermined temperature range, i.e., equal to or higher than a lower limit temperature TWVLVL (for example, 0° C.) and equal to or lower than an upper limit temperature TWVLVH (for example, 35° C.). This step 1 is provided for determining whether or not the engine 1 is normally started. More specifically, when the engine water temperature TM is lower than the lower limit temperature TWVLVL, some humidity sensor 22 cannot correctly detect the humidity of the post-adsorption exhaust gases due its lower sensibility, so that this situation must be eliminated. On the contrary, when the engine water temperature TW is higher than the upper limit temperature TWVLVH, this situation must be eliminated as well because the engine 1 could have been hot restarted.

Therefore, if the result of the determination at step 1 is No, i.e., if the engine water temperature TW is lower than the lower limit temperature TWVLVL or higher than the upper limit temperature TWVLVH, a fault determination execution flag f_MCNDVLV is set to "0" indicating that the fault determination for the switching valve 18 should not be performed (step 8), and a timer value TMVLV of an up-count timer is reset (step 9), followed by the termination of the program.

On the other hand, if the result of the determination at step 1 is Yes, i.e., if the engine water temperature TW is equal to or higher than the lower limit temperature TWVLVL and equal to or lower than the upper limit temperature TWVLVH, a saturated absolute humidity DS is calculated (step 2). This calculation involves first calculating a saturated vapor pressure ES (step 11) by searching a predetermined saturated vapor pressure ES map (not shown) in accordance with the HC adsorbent temperature TTRS and the atmospheric pressure PA at the start of the engine 1, as illustrated in FIG. 4.

In this embodiment, the HC adsorbent temperature TTRS is detected by the temperature sensor 24 attached to the branch pipe portion 17b of the coupling pipe 17. Alternatively, the HC adsorbent temperature TTRS may be replaced with an exhaust gas temperature detected by a temperature sensor attached to the exhaust pipe 4, or an intake air temperature detected by an existing intake air temperature sensor generally arranged in the engine 1. Also, the atmospheric pressure PA may be replaced with an intake pipe absolute pressure before starting the engine 1, detected by an existing intake air pressure sensor generally arranged in the engine 1.

Next, the saturated absolute humidity DS is calculated by the following equation (1) using the saturated vapor pressure ES calculated at step 11, and the HC adsorbent temperature TTRS (step 12):

$$DS = \frac{804}{1 + 0.00366 \times TTRS} \times \frac{ES}{PO}$$

where PO is a predetermined standard air pressure (for example, 760 mmHg).

Figure 6A:
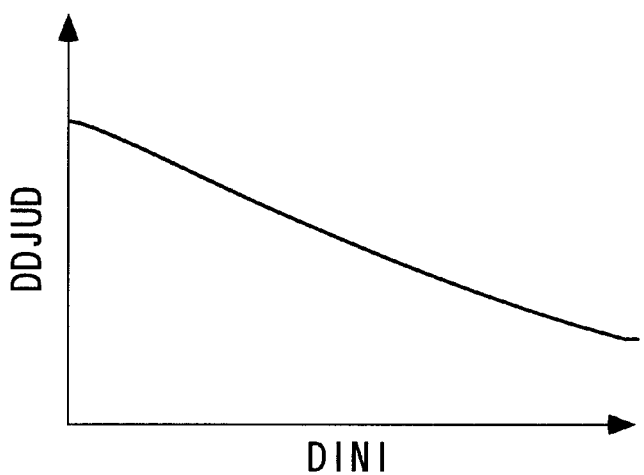
FIG. 6A is a table showing a relationship between an absolute humidity initial value DINI and an additional humidity value DDJUD.

After calculating the saturated absolute humidity DS by the equation (1), the absolute humidity D of the post-adsorption exhaust gases detected by the humidity sensor 22 at the start of the engine 1 is set as an absolute humidity initial value DINI at step 3 in FIG. 3. Then, an additional humidity value DDJUD for fault determination is calculated in accordance with the absolute humidity initial value DINI (step 4). This calculation is made by searching a table (additional humidity value table), as shown in FIG. 6A, which is stored in the ROM. In the additional humidity value table, the additional humidity value DDJUD is set substantially in a linear fashion such that it presents a smaller value as the absolute humidity initial value DINI is larger.

Figure 7:
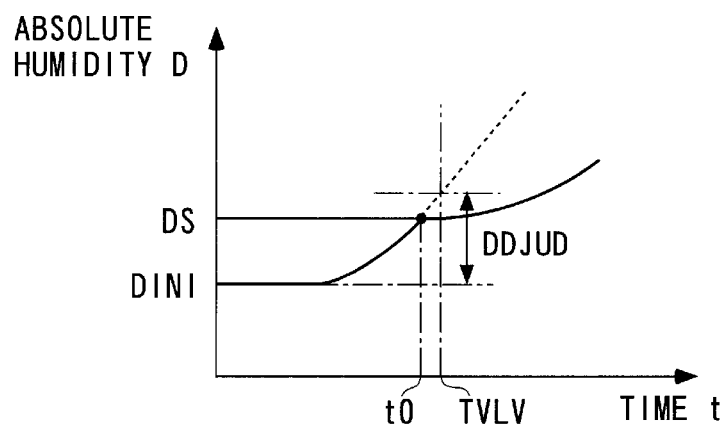
FIG. 7 is a time chart showing an exemplary transition of an absolute humidity D of post-adsorption exhaust gases when it reaches the saturated absolute humidity DS before the lapse of the fault determining time TVLV.

Next, it is determined whether or not the saturated absolute humidity DS calculated at step 2 is equal to or less than the sum of the absolute humidity initial value DINI and the additional humidity value DDJUD for the fault determination (step 5). The determination at the step 5 is made for the reason set forth below. As described later, it is determined that the switching valve 18 fails when the absolute humidity D of the post-adsorption exhaust gases is equal to or lower than a threshold value represented by the sum of the absolute humidity initial value DINI and the additional humidity value DDJUD, at the time a fault determining time TVLV, later described, has elapsed after the start of the engine 1. Therefore, if the threshold value is equal to or higher than the saturated absolute humidity DS (Yes at step 5), the absolute humidity D of the post-adsorption exhaust gases may have reached the saturated absolute humidity DS before the fault determining time TVLV elapses, as can be seen in FIG. 7 (at time t0 in FIG. 7). In this event, the absolute humidity D of the post-adsorption exhaust gases after the time t0 deviates from an essential transition indicated by a broken line in FIG. 7 but changes along a transition of the saturated absolute humidity DS. In this case, since the humidity sensor 22 indicates the saturated absolute humidity DS, an erroneous determination may be made that the switching valve 18 fails in spite of the fact that the switching valve 18 does not fail. Therefore, the determination at step 5 avoids such an erroneous determination as to a fault in the switching valve 18 in the case as mentioned above, thereby making it possible to improve the determination accuracy.

Also, since the absolute humidity D of the post-adsorption exhaust gases exhibits a lower rising rate as the absolute humidity initial value DINI is larger (see FIG. 8), the additional humidity value DDJUD is set to a smaller value as the absolute humidity initial value DINI is larger, as described above, in the additional humidity value table in FIG. 6A for correctly determining a fault in the switching valve 18 by properly setting the additional humidity value DDJUD.

Thus, if the result of the determination at step 5 is Yes, i.e., if the saturated absolute humidity DS is equal to or lower than the threshold value (the sum of the absolute humidity initial value DINI and the additional humidity value DDJUD), the fault determination execution flag f_MCNDVLV is set to "0" (step 8), indicating that the fault determination should not be performed, in order to avoid an erroneous determination on a fault in the switching valve 18, as described above, and the timer value TMVLV of the up-count timer is reset (step 9), followed by the termination of the program. On the other hand, if the result of the determination at step 5 is No, i.e., if the saturated absolute humidity DS is larger than the threshold value, the fault determination execution flag f_MCNDVLV is set to "1" (step 6), indicating that the fault determination should be performed for the switching valve 18. Subsequently, the fault determining time TVLV is calculated (step 7), the timer value TMVLV of the up-counter timer is once reset, and the up-count timer is again started (step 9), followed by the termination of the program.

Figure 6B:
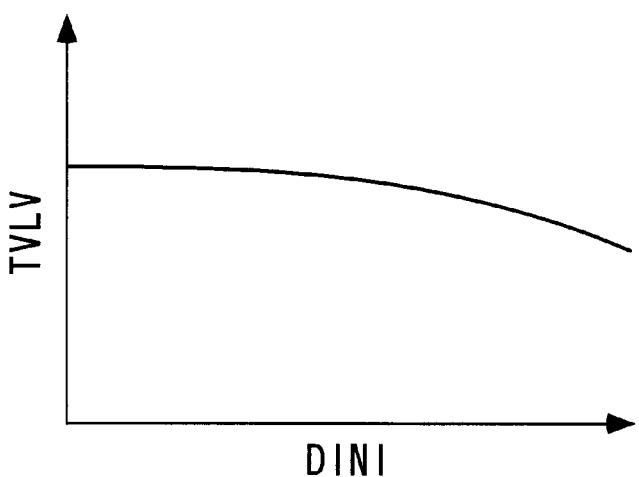
FIG. 6B is a table showing a relationship between the absolute humidity initial value DINI and a fault determining time TVLV.

The calculation of the fault determining time TVLV at step 7 is made by searching a table (fault determining time table) as shown in FIG. 6B in accordance with the absolute humidity initial value DINI. Since moisture (steam) in the post-adsorbent exhaust gases reaches a saturated state earlier as the absolute humidity initial value DINI is larger, an erroneous determination on a fault in the switching valve 18 may occur as described above. To avoid the erroneous determination, the fault determining time table is set such that the fault determining time TVLV gradually becomes smaller, drawing a gentle trajectory, as the absolute humidity initial value DINI is larger.

Next, a program for determining a fault in the switching valve 18 will be described with reference to the flow chart of FIG. 5. The illustrated program is executed in synchronism with the TDC signal inputted to the ECU 25 from the crank angle sensor 32. In this program, it is first determined at step 21 whether or not the fault determination execution flag f_MCNDVLV set in the execution determination in FIG. 3 is "1." If the result of the determination at this step 21 is No, i.e., if the fault determination execution flag f_MCNDVLV is "0," the program is terminated at this time, assuming that the fault determination for the switching valve 18 should not be performed. On the other hand, if the result of the determination at step 21 is Yes, i.e., the fault determination execution flag f_MCNDVLV is "1," it is determined whether or not the ECU 25 has outputted a control signal BPVLV for switching the exhaust passage to the bypass exhaust passage 15 by forcing the switching valve 18, which has closed the bypass exhaust passage 15, to open the same (step 22), and it is also determined whether or not EGR is being performed (step 23).

If the result of the determination at step 22 is No, i.e., if the ECU 25 has not outputted the control signal BPVLV to the switching valve 18, the bypass exhaust passage 15 is closed by the switching valve 18 so that no exhaust gases flow into the bypass exhaust passage 15. The fault determining apparatus 21 of this embodiment assumes that the fault determination is made for the switching valve 18 based on the humidity of exhaust gases detected by the humidity sensor 22 when the exhaust passage has been switched to the bypass exhaust passage 15 by the switching valve 18. Therefore, in this event, the program is terminated without further processing, so that the fault determination is not performed for the switching valve 18. Also, when the result of the determination at step 23 is Yes, i.e., when the EGR is being performed, moisture adsorbed by the HC adsorbent 13 is desorbed from the HC adsorbent 13 together with hydrocarbons and recirculated to the engine 1 through the EGR pipe 16, so that the humidity of the post-adsorption exhaust gases is not stabilized. Therefore, the program is terminated without further processing on the assumption that the condition for the fault determination is not established. Conversely, if the result of the determination at step 22 is Yes, and if the result of the determination at step 23 is No, the program proceeds to subsequent step 24, assuming that the condition for determining a fault in the switching valve 18 has been eventually established, in which case the ECU 25 fetches the absolute humidity D of the post-adsorption exhaust gases detected by the humidity sensor 22.

Next, at step 25, it is determined whether or not the timer value TMVLV of the up-count timer, started at step 9 in the execution determination, is equal to or larger than the fault determining time TVLV calculated at step 7 in the execution determination, i.e., whether or not the fault determining time TVLV has elapsed after the start of the engine 1. If the result of the determination at this step is No, the program is terminated without further processing. On the other hand, if the result of the determination at step 25 is Yes, i.e., if the fault determining time TLVL has elapsed after the start of the engine 1, it is determined whether or not the absolute humidity D of the post-adsorption exhaust gases fetched at step 24 is equal to or less than the sum (threshold value) of the absolute humidity initial value DINI and the additional humidity value DDJUD (step 26). If the result of the determination at step 26 is Yes, i.e., if the absolute humidity D is equal to or less than the threshold value, a fault flag f_DVLV is set to "1," assuming that the switching valve 18 fails, and the alarm lamp 26 is turned on for notifying the operator of the fault in the switching valve 18 (step 28). Then, the fault determination execution flag f_MCNDVLV is set to "0," regarding that the fault determination has been completed for the switching valve 18 (step 29), followed by the termination of the program.

In regard to the determination at step 26, if the switching valve 18 is normally operating so that exhaust gases are sufficiently flowing into the bypass exhaust passage 15, the absolute humidity D must exceed the threshold value at the time the fault determining time TVLV has elapsed after the start of the engine 1. Therefore, if the absolute humidity D does not exceed the threshold value, it is determined at step 26 that the switching valve 18 fails, assuming that exhaust gases are not at all flowing into the bypass exhaust passage 15 or are flowing but not sufficiently. Conversely, if the result of the determination at step 26 is No, i.e., if the absolute humidity D exceeds the threshold value, the fault flag f_DVLV is set to "0" (step 30), and the fault determination execution flag f_MCNDVLV is set to "0" (step 29), assuming that exhaust gases are sufficiently flowing into the bypass exhaust passage 15 and therefore the switching valve 18 is normally operating, followed by the termination of the program.

After the fault determination for the switching valve 18, as a result of setting the fault determination execution flag f_MCNDVLV set to "0" at step 29, the result of the determination subsequently made at step 21 is No, thereby resulting in the termination of the program without further processing. In other words, the fault determination for the switching valve 18 is performed only once during the operation of the engine 1.

Figure 8:
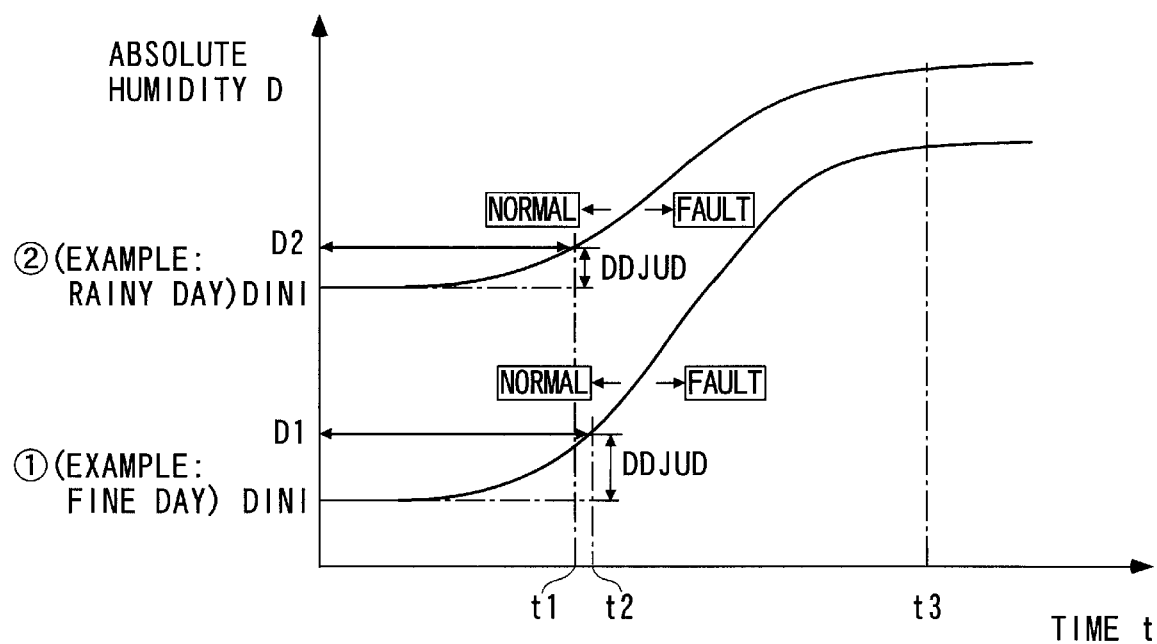
FIG. 8 is a time chart showing transitions, as threshold lines, of the absolute humidity detected by a humidity sensor from the start of the engine for each of a low absolute humidity initial value DINI and a high absolute humidity initial value DINI, respectively.

FIG. 8 shows transitions, as threshold lines, of the absolute humidity D detected by the humidity sensor 22 from the start of the engine 1 when the absolute humidity initial value DINI is low (for example, (1) on a fine day) and when it is high (for example, (2) on a rainy day), respectively. As shown in FIG. 8, either (1) on a fine day or (2) on a rainy day, the absolute humidity D transitions in the following manner. The absolute humidity D starts gradually increasing, after a certain time has elapsed from the start of the engine 1, increases at a higher rising rate, and subsequently (after time t3), converges to a constant value (saturated absolute humidity). The reason for such a transition may be explained as follows. As the switching valve 18 is operated to introduce exhaust gases into the bypass exhaust passage 15 immediately after the start of the engine 1, hydrocarbons and moisture in the exhaust gases are adsorbed by the HC adsorbent 13 to cause a gradual reduction in the adsorbing capacity of the HC adsorbent 13, resulting in a gradual increase, on the contrary, in moisture in the post-adsorption exhaust gases.

First, (1) a transition of the absolute humidity D of the post-adsorption exhaust gases on a fine day will be described with reference to FIG. 8. As shown in FIG. 8, when the switching valve 18 fails, the absolute humidity D is at a threshold value D1 or lower (the detected absolute humidity D transitions in a region below a threshold line of (1)) at time t2, i.e., even after the fault determining time TVLV has elapsed from the start of the engine 1, so that it can be determined that the switching valve 18 fails. On the other hand, when the switching valve 18 does not fail, the detected absolute humidity D transitions in a region above the threshold line of (1). Since the absolute humidity D exceeds the threshold value D1 when the fault determining time TVLV has elapsed (at time t2) after the start of the engine 1, it can be determined that the switching valve 18 does not fail. Similarly, (2) on a rainy day, as shown in FIG. 8, when the switching valve 18 fails, the absolute humidity D is at a threshold value D2 or lower (the detected absolute humidity D transitions in a region below a threshold line of (2)) even after the fault determining time TLVL has elapsed (at time t1), so that it can be determined that the switching valve 18 fails. On the other hand, when the switching valve 18 does not fail, the detected absolute humidity transitions in a region above the threshold line of (2). Since the absolute humidity D exceeds the threshold value D2 when the fault determining time TVLV has elapsed (at time t1), it can be determined that the switching valve is normal.

Also, in these cases, since the additional humidity value DDJUD is set smaller as the absolute humidity initial value DINI of the post-adsorption exhaust gases is larger (see FIG. 6A), a fault in the switching valve 18 can be correctly detected even on a rainy day in addition to a fine day.

As described above in detail, according to the fault determining apparatus 21 of this embodiment, a fault in the switching valve 18 can be determined by detecting the absolute humidity D of the post-adsorption exhaust gases after the start of the engine 1, and comparing the detected absolute humidity D with a threshold value (the sum of the absolute humidity initial value DINI and the additional humidity value DDJUD). Moreover, since the fault determination is performed for the switching valve 18 based on the absolute humidity D detected when the predetermined fault determining time TVLV has elapsed after the start of the engine 1, the fault determination can be reliably carried out at a predetermined timing after the fault determining time TVLV has elapsed from the start. In addition, unlike the prior art, the fault determination for the switching valve 18 is performed under the conditions in which the switching valve 18 should be operated, making use of its operation, so that the fault determination for the switching valve 18 can be directly, properly and rapidly carried out without the need for setting a special fault determination mode or waiting for the engine 1 to enter the steady-state operating condition. Further, since the humidity of exhaust gases is used as a parameter for determining a fault in the switching valve 18, the fault determination can be accurately and properly carried out.

Also, in the foregoing embodiment, a fault in the switching valve 18 is determined by comparing the absolute humidity D in the post-adsorption exhaust gases when the predetermined fault determining time TVLV has elapsed after the start of the engine 1 with a threshold value. The present invention, however, is not limited to this manner of determining a fault. Alternatively, a fault in the switching valve 18 may be determined based on another result associated with the humidity detected by the humidity sensor 22. Specifically, for example, a fault in the switching valve 18 may be determined making use of the amount of a change in humidity of post-adsorption exhaust gases per unit time, a time taken until a previously set constant humidity is reached after the start of the engine 1, and so on.

Further, in the foregoing embodiment, the switching valve 18 is controlled to switch the exhaust passage of exhaust gases to the bypass exhaust passage 15 immediately after the engine 1 is started and to the main exhaust passage after a predetermined time has elapsed. Alternatively, the exhaust passage of exhaust gases may be switched to the main exhaust passage 14 only when hydrocarbons and moisture are desorbed from the adsorbent 13 while the EGR is performed, whereas the exhaust passage may be maintained as switched to the bypass exhaust passage 15 in a normal operating state after the start of the engine.

It will be appreciated that detailed structures of the switching valve 18 and the fault determining apparatus 21 shown in the foregoing embodiment are illustrative by all means, and may be changed as appropriate within the spirit and scope of the present invention.

As described above in detail, the fault determining apparatus for a exhaust passage switching valve of the present invention can advantageously determine a fault in the exhaust passage switching valve directly, rapidly and properly under conditions in which the switching valve should be essentially operated, such as immediately after the start of an internal combustion engine, without the need for setting a special fault determination mode.

What is claimed is:

1. A fault determining apparatus for determining a fault in an exhaust passage switching valve for switching an exhaust passage of exhaust gases discharged from an internal combustion engine between a first exhaust passage having a three-way catalyst and a second exhaust passage branched off at a location downstream of said three-way catalyst of said first exhaust passage and having filled in an intermediate portion thereof an adsorbent capable of adsorbing hydrocarbons and moisture in the exhaust gases in accordance with an activated state of said three-way catalyst, said fault determining apparatus comprising:

a humidity sensor arranged at a location downstream of said adsorbent in said second exhaust passage for detecting a humidity of said exhaust gases introduced into said second exhaust passage; and switching valve fault determining means for determining a fault in said exhaust passage switching valve based on a result of detection performed by said humidity sensor when said exhaust passage should have been switched to said second exhaust passage by said exhaust passage switching valve.

2. A fault determining apparatus for an exhaust passage switching valve according to claim 1, wherein said switching valve fault determining means determines a fault in said exhaust passage switching valve based on the result of detection performed by said humidity sensor when a predetermined time has elapsed from a start of said internal combustion engine.

3. A fault determining apparatus for an exhaust passage switching valve according to claim 1, further comprising:

atmospheric state detecting means for detecting an atmospheric state;

fault determination execution deciding means for deciding whether or not a fault determination is performed for said exhaust passage switching valve by said switching valve fault determining means based on results of detections performed by said atmospheric state detecting means and said humidity sensor at the start of said internal combustion engine.

4. A fault determining apparatus according to claim 1, wherein said adsorbent includes zeolite.

* * * * *